United States Patent [19]

Ames, Sr.

[11] 3,712,524
[45] Jan. 23, 1973

[54] BOAT LOADER FOR AUTOMOBILES

[76] Inventor: Russell K. Ames, Sr., 3205 Gilbert Street, Duluth, Minn. 55806

[22] Filed: March 19, 1971

[21] Appl. No.: 126,183

[52] U.S. Cl. ............................ 224/42.1 H, 214/450
[51] Int. Cl. ................................................ B60r 9/04
[58] Field of Search......... 214/450, 85.1; 224/42.1 D, 224/42.1 E, 42,1 F, 42,1 G, 42.1 H, 29

[56] References Cited

UNITED STATES PATENTS

| | | | |
|---|---|---|---|
| 2,469,945 | 5/1949 | Brei | 224/42.1 H |
| 3,612,366 | 10/1971 | Schneider | 214/85.1 |
| 3,527,371 | 9/1970 | Townsend | 214/85.1 |
| 3,606,111 | 9/1971 | Gjesdahl | 224/29 R |
| 2,624,497 | 1/1953 | Newman | 224/42.1 H |
| 2,325,762 | 8/1943 | Ford | 224/42.1 H |
| 2,812,087 | 11/1957 | Zoller | 214/450 |
| 1,037,226 | 9/1912 | Feeney | 214/41 |
| 2,247,128 | 6/1941 | Levey | 224/42.1 H |
| 2,464,979 | 3/1949 | Hyatt | 224/42.1 H |

Primary Examiner—Gerald M. Forlenza
Assistant Examiner—John Mannix
Attorney—Merchant & Gould

[57] ABSTRACT

Apparatus for use in loading a boat onto an automobile roof-top carrier. The loader apparatus is mounted on an automobile deck portion (e.g. a trunk lid) and includes a transverse roller member rotatably supported by vertical legs removably attached to the trunk lid. In loading the boat, a front portion thereof is raised onto the roller member and the boat is then slid upwardly and forwardly on the roller until its weight is properly distributed on the roof-top carrier.

4 Claims, 6 Drawing Figures

3,712,524

INVENTOR
RUSSELL K. AMES, SR.
BY MERCHANT & GOULD
ATTORNEYS

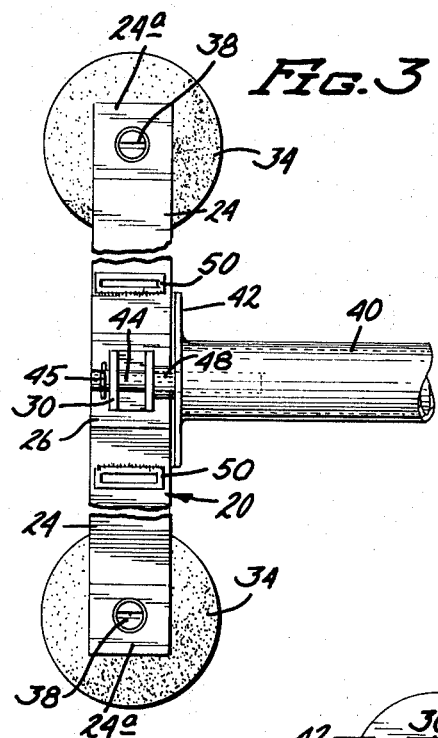
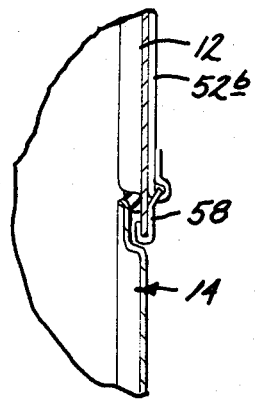
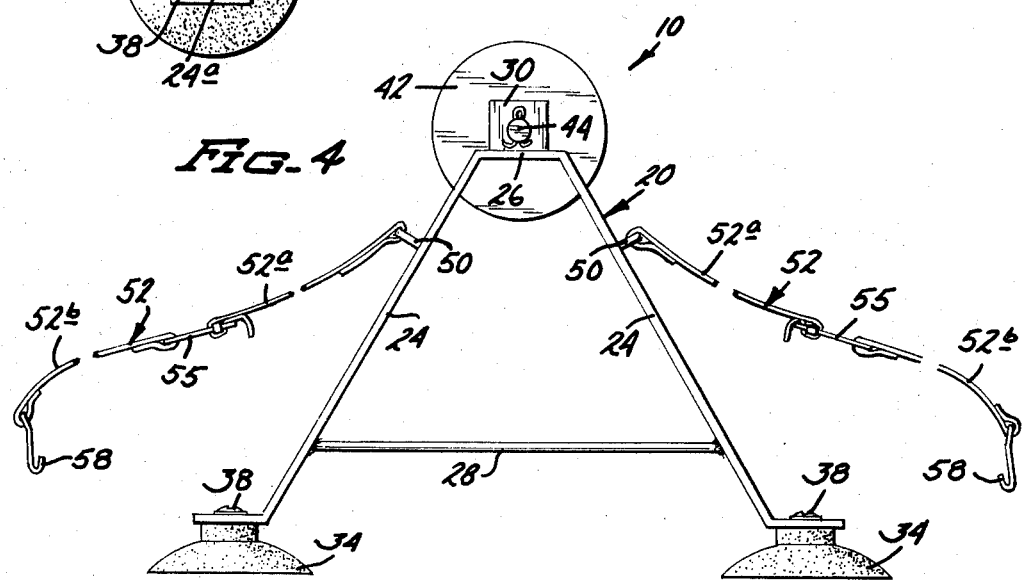
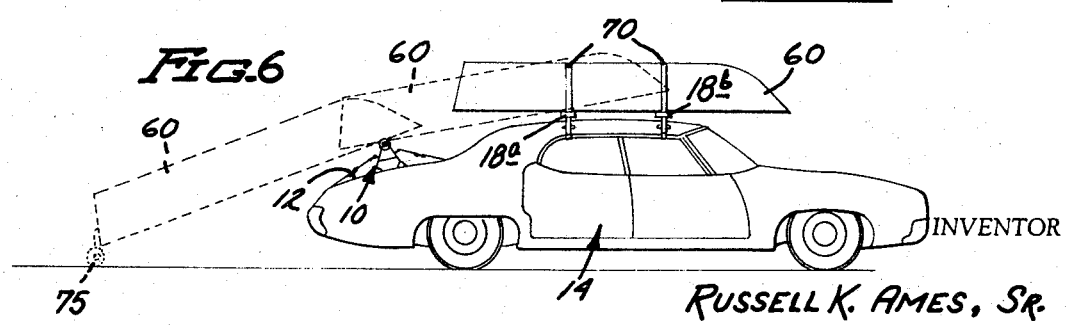

BOAT LOADER FOR AUTOMOBILES

Background of the Invention

The present invention relates to apparatus for use in loading articles onto an automobile roof.

Often times, it is necessary to transport a large object on the roof of an automobile. For example, boats, canoes, and the like are frequently transported on automobile roofs. For such transportation purposes, a wide variety of roof-top carriers are commercially available for supporting and securing the boat on the vehicle roof. However, one significant disadvantage with this mode of transportation is the extreme difficulty which is commonly incurred in positioning the boat on the roof-top carrier. For instance, in the case of a small pleasure boat weighing typically 125–200 pounds, it is extremely difficult for an individual to single-handedly load the boat onto the carrier. In fact, such single-handed attempts often cause injury to the individual, automobile or boat.

Normally, a boat is placed onto an automobile roof-top carrier by lifting it vertically from a position along the side of the car to a height slightly greater than the height of the carrier. The boat is then moved horizontally onto the carrier. Although it is known to incorporate a roller member as a part of the roof-top carrier thereby allowing the boat to be slid onto the carrier from the rear of the vehicle, such an approach still necessitates initially lifting the boat to the height of the carrier. See, for example, U.S. Pat. No. 2,469,987. Thus, simply designed loader apparatus which eliminates the necessity of lifting the boat or other article to such heights is commercially desirable.

SUMMARY OF THE INVENTION

This invention provides apparatus for use in loading boats and other large objects onto an automobile roof. The apparatus includes first and second support members which are removably attachable to a generally horizontal deck portion of an automobile (e.g. the trunk cover or lid) and which extend vertically upward therefrom. A roller member extends between the vertical support members transversely to the automobile and is rotatably carried by the support members. To load an object (e.g. a boat) onto an automobile roof-top carrier, a forward portion of the boat is placed onto the transverse roller member and the boat is then slid along the roller member upwardly and forwardly onto the roof-top carrier.

The present invention eliminates the large vertical lift presently incurred in loading boats onto an automobile roof-top carrier. Rather, it is only necessary to raise the front portion of the boat to the height of the trunk lid on which the transverse roller member is located. Once this is accomplished, the boat can then be easily slid along the roller member upwardly and forwardly onto the roof-top carrier. In most instances, this allows an individual to safely and single-handedly load the boat. Another particularly advantageous feature of this invention is that it is attachable to the trunk lid in a manner so as not to necessitate its removal to gain access to the storage compartment. Numerous additional advantages, such as the simplicity of the construction of the present loader apparatus, will become apparent from a reading of the detailed description hereinbelow.

BRIEF DESCRIPTION OF THE DRAWINGS

FIG. 3 is a top view of one end of the present boat loader;

FIG. 4 is a side elevational view of the present boat loader including adjustable straps for facilitating the securing of the loader to the trunk cover;

FIG. 5 is a cross-sectional view through the plane 5—5 of FIG. 1; and

FIG. 6 is a side elevational view of an automobile having the present boat loader attached thereto for use in loading a boat onto a roof-top carrier.

DETAILED DESCRIPTION OF THE PREFERRED EMBODIMENT

Figure 1:
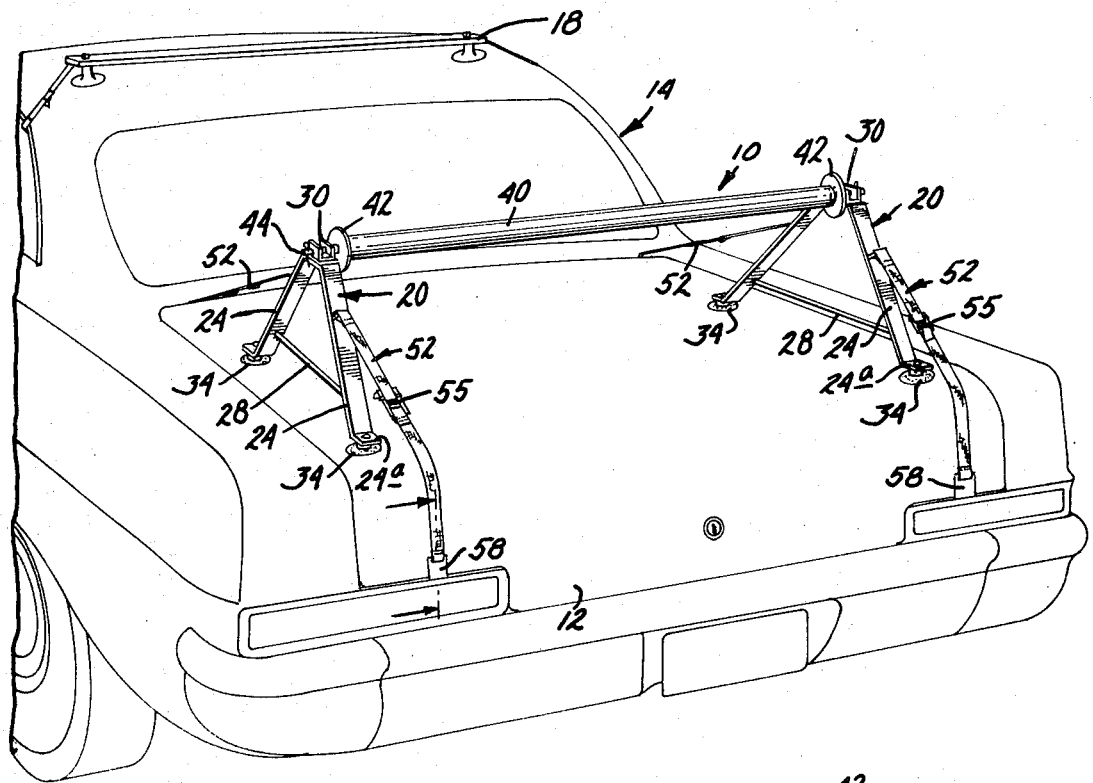
FIG. 1 is a perspective view of the present boat loader illustrating its positioning on the lid of an automobile trunk.
Figure 2:
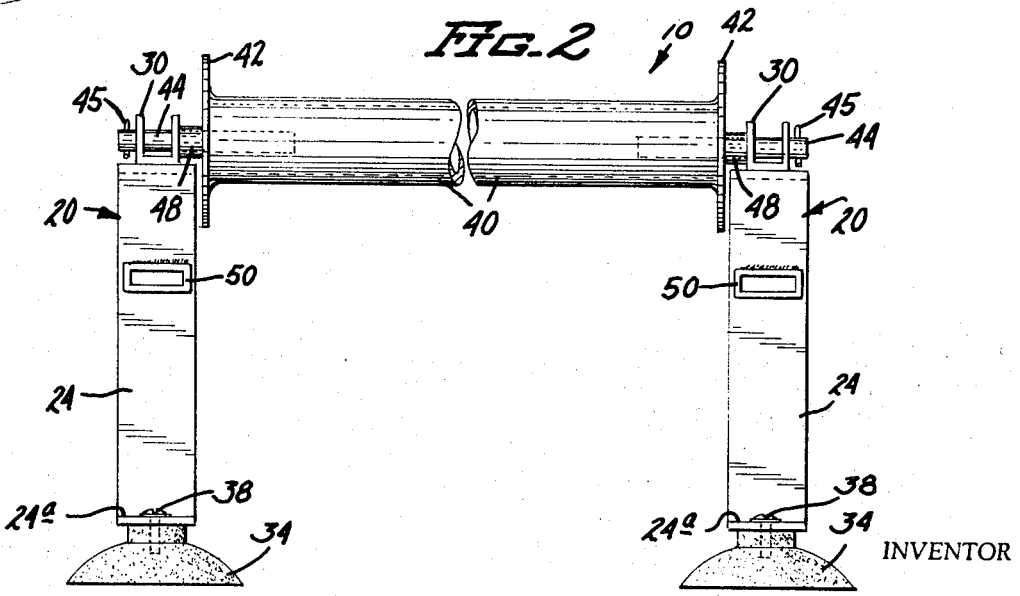
FIG. 2 is a front elevational view of the present invention wherein the fastening straps have been removed.

Referring with particularity to FIG. 1, the present loader apparatus, generally designated 10, is shown attached to the trunk lid 12 of the rear deck portion of an automobile 14. As will become apparent form the following description, loader apparatus 10 can be utilized to facilitate the loading of numerous large objects onto any conventional roof-top carrier such as carrier 18. For example, the present invention is particularly applicable for loading a boat onto roof-top carrier 18 and the following description relates entirely to such an application.

As illustrated, boat loader 10 includes two identical vertical support members 20, only one of which is described in detail. The support member 20 is generally in the form of an A frame formed by two upwardly and inwardly extending legs 24 joined by a member 26 extending horizontally between the top ends thereof. In the embodiment shown, legs 24 and horizontal member 26 are formed from a single piece of strap iron. A support brace 28 extends between the two angular legs 24 toward the bottom ends thereof and provides additional strength thereto. A journal bearing 30 for the purpose hereinafter described is attached to the upper surface of horizontal member 26. In the embodiment illustrated, the bearing 30 takes the form of a U-shaped member having suitable openings for receiving a shaft through the two vertical walls thereof. Numerous alternative types of conventional journal bearings can be utilized. A suction cup 34 is attached by a screw 38 to an outwardly flared portion 24a of the bottom end of each of the legs 24. Various size suction cups can, of course, be utilized.

A transverse roller member 40 extends horizontally between the two vertical supports 20. As illustrated, the roller member 40 is generally tubular having a flange 42 at each end thereof. A shaft 44 is welded to each of the two flanges 42 and extends outwardly therefrom into the respective journal bearings 30. A cotter key 45 at the outer end of each shaft 44 retains the shaft within the respective bearings 30. A thrust washer 48 is mounted on shaft 44 between each of the flanges 42 and bearings 30.

Each of the support legs 24 includes a strap loop 50 welded to the outer surface thereof. An adjustable fastening strap 52 is attached to each of these loops.

The straps 52 each include two strap pieces 52a and 52b joined by a buckle 55 which allows adjustment of the overall length of the strap. As shown, the nonjoined or the free end of each strap 52a is attached to one of the loops 50 and the free end of each strap 52b has attached thereto a hook-like member 58. The hook 58 engages either the front or rear edge of trunk lid 12 as shown particularly well in FIG. 5. It should be understood, however, that numerous alternative types of adjustable straps (e.g. an elastic strap) could be utilized.

To position boat loader 10 onto the trunk 12 of automobile 14, the apparatus 10 is positioned in its upright position on the trunk lid. The suction cups 34 at the ends of the support legs 24 are then depressed downwardly so as to engage lid 12 securing boat loader 10 thereto. To provide additional securing, each of the hook-like members 58 of fastening strap 52 is inserted under either the front or rear edge of trunk lid 12 as shown in FIGS. 1 and 5. The straps 52 are then tightened by adjusting the length thereof. When so positioned, boat loader 10 is securely attached to trunk lid 12 without interfering with the operation thereof. That is to say, trunk lid 12 can be swung to its open position for access to the storage compartment without necessitating the removal of boat loader 10. Thus, once attached to lid 12, boat loader 12 can remain attached thereto during the useage of vehicle 18. Boat loader 10 can, of course, be removed from lid 12 by reversing the procedure for attaching it thereto. When desired, the apparatus 12 can be easily disassembled for storage or transportation purposes.

With particular reference to FIG. 6, boat loader 10 facilitates the loading of a boat 60 onto roof-top carrier 18 as follows. Initially, boat 60 is inverted and the front portion thereof is lifted vertically so as to rest on transverse member 40. The boat 60 is then pushed forwardly and upwardly until the rearward portion rests on roller member 40 and the forward portion engages the rearward member 18a of the roof-top carrier. During this phase of the loading, boat 60 slides readily along the rotatable member 40. Transverse movement of boat 60 is prevented by the flanges 42. In the next phase of the loading, the weight of the rearward portion of boat 60 is manually supported without the aid of boat loader 10 and the boat is pushed forward until its weight is equally distributed onto the forward and rearward roof-top carrier members 18a and 18b. Since the weight of boat 60 is carried primarily by rearward roof-top carrier member 18a during this phase of the loading, an individual can single-handedly position the boat 60 onto the roof-top carrier. Once positioned in its proper position on the roof-top carrier, boat 60 is secured to the carrier by a pair of straps 70. As shown, a wheel 75 attached to the rearward end of boat 60 can be utilized to facilitate the loading, but is unnecessary for the practice of the present invention.

As is apparent from the above description, boat loader apparatus 10 allows an individual to single-handedly position a boat onto an automobile roof-top carrier. Utilizing the present invention, this can be accomplished readily and safely. Although the present invention is best suited for attachment to the rear deck portion of a sedan-type automobile, it can be attached to the front deck portion or hood of an automobile as well. However, this necessitates removal of loader 10 during the operation of automobile 12 so as not to interfere with the vision of the vehicle operator.

Although the present invention has been described with particular reference to one preferred embodiment thereof, numerous modifications thereto are within the skill of the artisan. For example, it is readily apparent that changes in size (e.g. the length of transverse roller bar 40) may be necessary to adapt this invention to various size trunk lids. In view of this, it is my intent to be limited only by the spirit and scope of the appended claims.

What is claimed is:

1. an automobile top carrier and handler comprising:
   a. a carrier positioned on the roof of an automobile to independently carry a boat;
   b. first and second support members, including two upwardly and inwardly extending legs, removably attachable to the trunk portion of the automobile so as to extend generally, vertically upward therefrom, bearing means attached to each of said support members adjacent the apex of said angularly extending legs, and suction cups attached to the lower end of each of said legs; and
   c. a single, generally tubular shaped roller, parallel to the trunk lid of the automobile and extending transversely between said first and second support members, and rotatably journaled within said bearing means for rotating in response to movement of a boat positioned thereon, thereby allowing the boat to be slidably moved along said roller member upwardly and forwardly onto the carrier positioned on the automobile.

2. The loading apparatus of claim 1 wherein said first and second support members each include adjustable strap pieces having a first end attached to said member and a second end removably attachable to the trunk portion.

3. The loading apparatus of claim 2 wherein said first and second support members are attachable to the trunk lid of an automobile so as to allow opening of the lid while said members are attached thereto.

4. The loading apparatus of claim 3 wherein:
   a. said adjustable strap pieces each include a hook-like member attached to said second end thereof for removably engaging an edge of the automobile trunk cover; and
   b. said transverse roller member includes flange means at opposite transverse ends thereof to prevent transverse movement of objects moved thereon.

* * * * *